US012798011B2

(12) United States Patent
Miura

(10) Patent No.: US 12,798,011 B2
(45) Date of Patent: Nov. 17, 2026

(54) LASER PROCESSING APPARATUS

(71) Applicant: DISCO CORORATION, Tokyo (JP)

(72) Inventor: Seiji Miura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 692 days.

(21) Appl. No.: 18/315,636

(22) Filed: May 11, 2023

(65) Prior Publication Data

US 2023/0364707 A1 Nov. 16, 2023

(30) Foreign Application Priority Data

May 12, 2022 (JP) ................................ 2022-078562

(51) Int. Cl.

| | |
|---|---|
| ***B23K 26/364*** | (2014.01) |
| ***B23K 26/03*** | (2006.01) |
| ***B23K 26/16*** | (2006.01) |
| *B23K 26/064* | (2014.01) |

(52) U.S. Cl.

CPC .......... *B23K 26/364* (2015.10); *B23K 26/032* (2013.01); *B23K 26/16* (2013.01); *B23K 26/064* (2015.10); *B23K 26/0643* (2013.01); *B23K 26/0648* (2013.01)

(58) Field of Classification Search

CPC .... B23K 26/032; B23K 26/364; B23K 26/16; B23K 26/064; B23K 26/0643; B23K 26/0648

See application file for complete search history.

(56) References Cited

U.S. PATENT DOCUMENTS

| | | | | |
|---|---|---|---|---|
| 7,732,729 | B2 * | 6/2010 | Kobayashi ........... | B23K 26/705 219/121.62 |
| 8,263,900 | B2 * | 9/2012 | Maehara .............. | B23K 26/142 219/121.67 |
| 10,276,413 | B2 * | 4/2019 | Aikawa ................ | B23K 26/032 |

(Continued)

FOREIGN PATENT DOCUMENTS

| | | |
|---|---|---|
| CN | 103227124 A | 7/2013 |
| CN | 117242404 A | 12/2023 |

(Continued)

OTHER PUBLICATIONS

Office Action issued by the JP Office Action in corresponding Application No. 2022-078562, dated Jan. 6, 2026.

(Continued)

*Primary Examiner* — Courtney D Heinle
*Assistant Examiner* — Behnoush Haghighian
(74) *Attorney, Agent, or Firm* — Greer, Burns & Crain, Ltd.

(57) ABSTRACT

A laser processing apparatus for processing a workpiece includes a holding table that holds the workpiece and a laser beam irradiation unit that applies a laser beam to the workpiece held on the holding table. The laser beam irradiation unit has a laser oscillator that emits the laser beam, a condenser that focuses the laser beam emitted from the laser oscillator, at least one optical component that guides the laser beam from the laser oscillator to the condenser, a casing that accommodates the at least one optical component, and an ionizer that is disposed inside the casing and captures contaminants that are present inside the casing.

18 Claims, 4 Drawing Sheets

(56) References Cited

U.S. PATENT DOCUMENTS

| | | | | |
|---|---|---|---|---|
| 2004/0164061 | A1* | 8/2004 | Takeuchi | B23K 26/0624 219/121.73 |
| 2011/0042362 | A1* | 2/2011 | Maehara | B23K 26/142 219/121.67 |
| 2015/0283650 | A1* | 10/2015 | Aikawa | B23K 26/032 219/121.8 |
| 2021/0066101 | A1* | 3/2021 | Uryu | G01J 1/4257 |
| 2022/0314365 | A1* | 10/2022 | Johnson | B23K 26/082 |

FOREIGN PATENT DOCUMENTS

| | | | |
|---|---|---|---|
| JP | 05146717 | A | 6/1993 |
| JP | 07021277 | U | 4/1995 |
| JP | 2002217476 | A | 8/2002 |
| JP | 2003320466 | A | 11/2003 |
| JP | 2008236148 | A | 10/2008 |
| TW | 464879 | B | 11/2001 |

OTHER PUBLICATIONS

Office Action received in related Taiwanese patent application No. 11520819860 mailed on Aug. 7, 2026 (7 pages).

* cited by examiner

LASER PROCESSING APPARATUS

BACKGROUND OF THE INVENTION

Field of the Invention

The present invention relates to a laser processing apparatus for processing a workpiece by irradiation with a laser beam.

Description of the Related Art

In a manufacturing process of device chips, a wafer with devices respectively formed in a plurality of regions, which are defined by a plurality of streets (scribe lines) aligned in a grid pattern, is used. By dividing and singulating this wafer along the streets, device chips including the devices are obtained. Such device chips are incorporated in various kinds of electronic equipment such as mobile phones and personal computers.

To divide the wafer, a cutting machine that cuts the wafer as a workpiece by an annular cutting blade is used. In recent years, development of a process that uses laser processing by a laser processing apparatus to divide wafers is also under way. The laser processing apparatus includes a holding table that holds the wafer as a workpiece, and a laser beam irradiation unit that applies a laser beam. The wafer is held on the holding table, and the laser beam is applied from the laser beam irradiation unit to the wafer, whereby laser processing is applied to the wafer. Disclosed, for example, in JP 2003-320466A is a method that removes a low dielectric constant insulating film, which is formed on a wafer, along streets by irradiation with a laser beam before the wafer is cut with a cutting blade. The use of this method makes it possible to avoid contact of the cutting blade which is rotating at high speed with the low dielectric constant insulating film when the cutting blade is caused to cut into the wafer along the streets, so that peeling of the low dielectric constant insulating film is prevented.

SUMMARY OF THE INVENTION

The laser beam irradiation unit mounted on the laser processing apparatus includes an optical system that guides, to the workpiece, the laser beam emitted from a laser oscillator. The optical system includes a variety of optical components, such as a mirror that reflects the laser beam in a predetermined direction and a condenser that focuses the laser beam.

If contaminants such as particles (dirt, dust, and the like) deposit on the optical components of the optical system, there may arise a variety of inconveniences such as a distortion in the profile, a deviation in the focus position, and a decrease in the output of the laser beam. Therefore, the laser beam irradiation unit is provided with a casing to accommodate the optical system therein, and the optical components are arranged inside the casing in such a manner as to isolate them from the outside. This can prevent particles and the like in the atmosphere from depositing on the optical components. However, components other than the optical components, which make up the optical system, are also arranged inside the casing. For example, holders that hold the optical components and actuators that control the positions or angles of the optical components, such as motors, are also accommodated along with the optical components in the casing. Outgas released from the holders and the actuators may therefore deposit on the optical components to contaminate them even if the interior of the casing is isolated and sealed. Moreover, at the time of maintenance of the laser processing apparatus, a case that makes up the casing is opened to conduct adjustments, replacements, cleaning, and/or the like of the optical components. At that time, particles may penetrate into the casing and may stay there, and may deposit on the optical components that have been subjected to the maintenance. It is accordingly difficult to completely prevent the deposition of contaminants on the optical components even if the optical system of the laser beam irradiation unit is accommodated in the casing.

In view of the foregoing problem, the present invention has as an object thereof the provision of a laser processing apparatus that can suppress the deposition of contaminants on optical components.

In accordance with an aspect of the present invention, there is provided a laser processing apparatus for processing a workpiece. The laser processing apparatus includes a holding table that holds the workpiece and a laser beam irradiation unit that applies a laser beam to the workpiece held on the holding table. The laser beam irradiation unit has a laser oscillator that emits the laser beam, a condenser that focuses the laser beam emitted from the laser oscillator, at least one optical component that guides the laser beam from the laser oscillator to the condenser, a casing that accommodates the at least one optical component, and an ionizer that is disposed inside the casing and captures contaminants that are present inside the casing.

Preferably, the ionizer may be of a windless type. Also preferably, the laser processing apparatus may further include a determination section that determines cleanliness inside the casing on the basis of a quantity of ions produced by the ionizer.

The laser processing apparatus according to the aspect of the present invention includes the casing that accommodates the at least one optical component, in other words, one or more optical components of the laser beam irradiation unit, and the ionizer that captures contaminants is disposed inside the casing. Owing to these, the contaminants that are present inside the casing are less likely to deposit on the one or more optical components, thereby making it possible to irradiate the workpiece with the laser beam under appropriate conditions.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
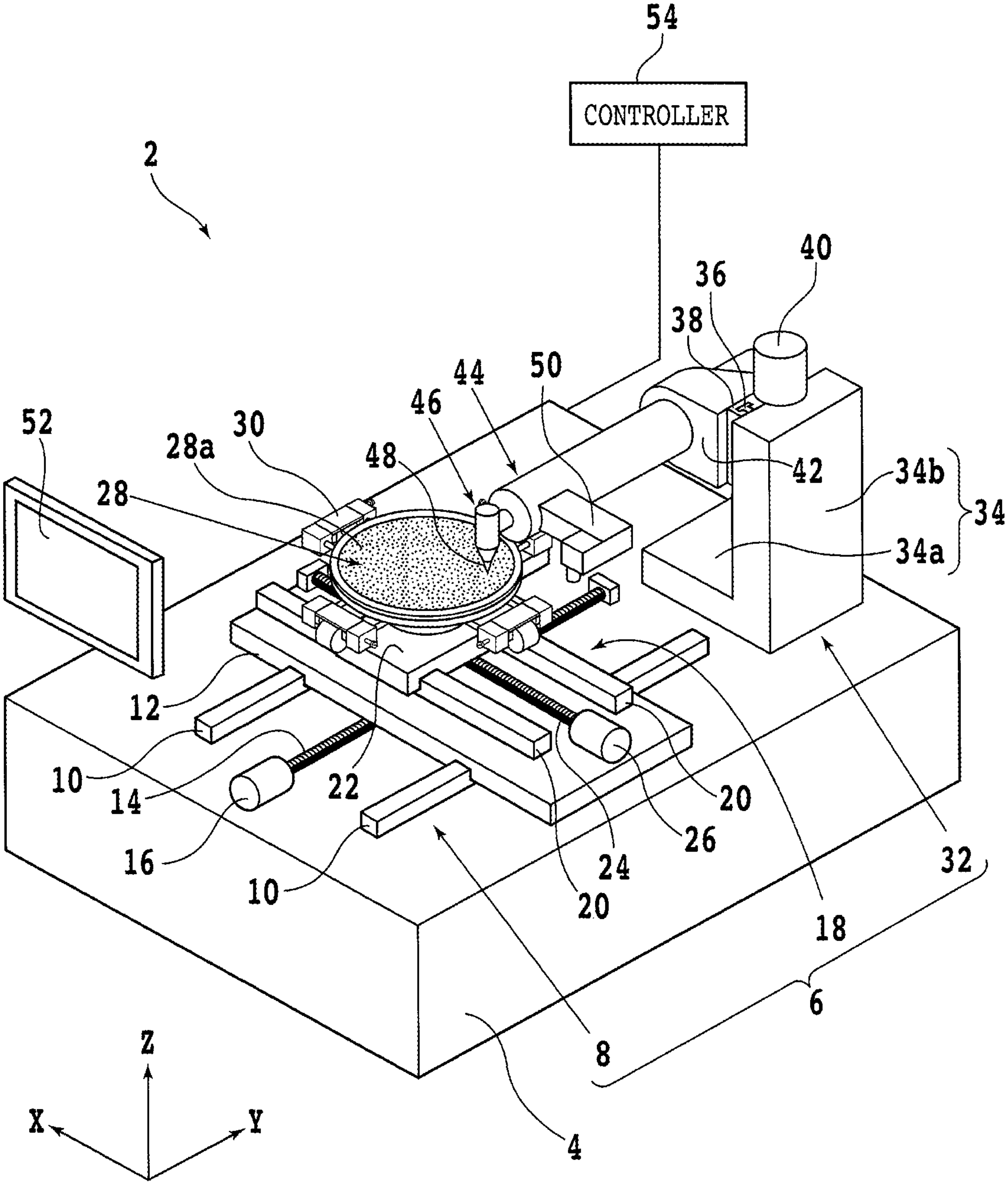
FIG. 1 is a perspective view illustrating a laser processing apparatus according to an embodiment of an aspect of the present invention.

With reference to the attached drawings, an embodiment of an aspect of the present invention will hereinafter be described. First, a description will be made with regard to a configuration example of a laser processing apparatus 2 according to the present embodiment. FIG. 1 is a perspective view illustrating the laser processing apparatus 2. In FIG. 1, an X-axis direction (processing feed direction, first horizontal direction, left-right direction) and a Y-axis direction (indexing feed direction, second horizontal direction, front-rear direction) are perpendicular to each other, and a Z-axis direction (vertical direction, height direction, up-down direction) is perpendicular to the X-axis direction and the Y-axis direction.

The laser processing apparatus 2 includes a bed 4 supporting individual elements that make up the laser processing apparatus 2. An upper surface of the bed 4 is a planar surface substantially parallel to a horizontal plane (X-Y plane), and a moving unit (moving mechanism) 6 is disposed on the upper surface of the bed 4. The moving unit 6 includes a Y-axis moving unit (indexing feed unit) 8, an X-axis moving unit (processing feed unit) 18, and a Z-axis moving unit 32.

The Y-axis moving unit 8 includes a pair of Y-axis guide rails 10 arranged along the Y-axis direction on the upper surface of the bed 4. On the paired Y-axis guide rails 10, a plate-shaped Y-axis moving table 12 is mounted slidably along the Y-axis guide rails 10. On a side of a back surface (lower surface) of the Y-axis moving table 12, a nut portion (not illustrated) is disposed. Threadedly engaged with this nut portion is a Y-axis ball screw 14 arranged along the Y-axis direction between the paired Y-axis guide rails 10. To an end portion of the Y-axis ball screw 14, a Y-axis pulse motor 16 is connected to rotate the Y-axis ball screw 14. When the Y-axis ball screw 14 is rotated by the Y-axis pulse motor 16, the Y-axis moving table 12 is moved in the Y-axis direction along the Y-axis guide rails 10.

The X-axis moving unit 18 includes a pair of X-axis guide rails 20 arranged along the X-axis direction on a front surface (upper surface) of the Y-axis moving table 12. On the paired X-axis guide rails 20, a plate-shaped X-axis moving table 22 is mounted slidably along the X-axis guide rails 20. On a side of a back surface (lower surface) of the X-axis moving table 22, a nut portion (not illustrated) is disposed. Threadedly engaged with this nut portion is an X-axis ball screw 24 arranged along the X-axis direction between the paired X-axis guide rails 20. To an end portion of the X-axis ball screw 24, an X-axis pulse motor 26 is connected to rotate the X-axis ball screw 24. When the X-axis ball screw 24 is rotated by the X-axis pulse motor 26, the X-axis moving table 22 is moved in the X-axis direction along the X-axis guide rails 20.

To the Y-axis moving unit 8 and the X-axis moving unit 18, a holding table (chuck table) 28 is connected. The holding table 28 holds a workpiece 11 (see FIG. 2) to which laser processing is applied by the laser processing apparatus 2. The holding table 28 is arranged on a front surface (upper surface) of the X-axis moving table 22. Around the holding table 28, a plurality of clamps 30 are disposed to hold and fix an annular frame 17 with the workpiece 11 supported thereon (see FIG. 2).

Figure 2:
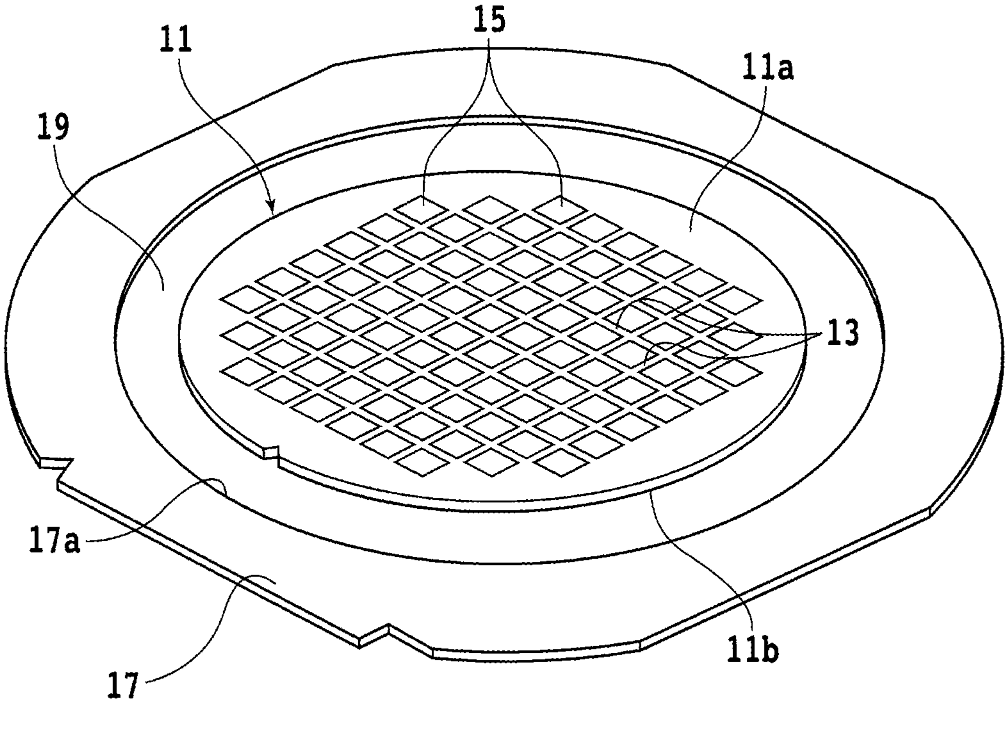
FIG. 2 is a perspective view illustrating an example of a workpiece to be processed by the laser processing apparatus.

FIG. 2 is a perspective view illustrating the workpiece 11. For example, the workpiece 11 is a disk-shaped wafer made of a semiconductor material such as single-crystal silicon, and includes a front surface 11*a* and a back surface 11*b*, which are substantially parallel to each other. The workpiece 11 is defined into a plurality of rectangular regions by a plurality of streets (scribe lines) 13 arrayed in a grid pattern to intersect each other. In the regions defined by the streets 13, devices 15 such as integrated circuits (ICs), large scale integration (LSI) circuits, light emitting diodes (LEDs), or micro electro mechanical systems (MEMS) devices are formed, respectively, on a side of the front surface 11*a*.

No limitations are however imposed on the kind, material, shape, structure, size, and the like of the workpiece 11. The workpiece 11 may be, for example, a substrate (wafer) made of a semiconductor other than silicon (gallium arsenide (GaAs), indium phosphide (InP), gallium nitride (GaN), silicon carbide (SiC), or the like), sapphire, glass, ceramics, resin, metal, or the like. Further, no limitations are imposed on the kind, number, shape, structure, size, arrangement, and the like of the devices 15, and the devices 15 may not be formed on the workpiece 11.

When the workpiece 11 is processed by the laser processing apparatus 2 (see FIG. 1), the workpiece 11 is supported by the annular frame 17 for the convenience of its handling (transfer, holding, and the like). The frame 17 is made of such metal as stainless steel (SS), and in a central part of the frame 17, a circular opening 17*a* is disposed extending through the frame 17 in a thickness direction. The opening 17*a* has a diameter greater than that of the workpiece 11. On the workpiece 11 and the frame 17, a circular sheet 19 is fixed. Employed as the sheet 19 is, for example, a tape that includes a film-shaped base material formed in a circular shape and an adhesive layer (glue layer) disposed on the base material. The base material is formed from such resin as a polyolefin, polyvinyl chloride, or polyethylene terephthalate. Meanwhile, the adhesive layer is formed of an epoxy, acrylic, or rubber-based adhesive, for example. The adhesive layer may also be formed of an ultraviolet curable resin. With the workpiece 11 arranged inside the opening 17*a* of the frame 17, the sheet 19 is bonded at a central portion thereof to the side of the back surface 11*b* of the workpiece 11, and is also bonded at an outer peripheral portion thereof to the frame 17. As a consequence, the workpiece 11 is supported by the frame 17 via the sheet 19.

As illustrated in FIG. 1, an upper surface of the holding table 28 is a planar surface substantially parallel to the horizontal plane (X-Y plane), and makes up a holding surface 28*a* that holds the workpiece 11. The holding surface 28*a* is connected to a suction source (not illustrated) such as an ejector via a flow channel (not illustrated) formed inside the holding table 28, a valve (not illustrated), and the like.

When the Y-axis moving table 12 is moved along the Y-axis direction, the holding table 28 is moved along the Y-axis direction. Meanwhile, when the X-axis moving table 22 is moved along the X-axis direction, the holding table 28 is moved along the X-axis direction. To the holding table 28, a rotary drive source (not illustrated) such as a motor is connected to rotate the holding table 28 about an axis of rotation that is substantially parallel to the Z-axis direction.

On a rear end portion of the bed 4 (behind the Y-axis moving unit 8, the X-axis moving unit 18, and the holding table 28), the Z-axis moving unit 32 is disposed. The Z-axis moving unit 32 includes a support structure 34 arranged on the upper surface of the bed 4. The support structure 34 includes a cuboidal base portion 34*a* fixed on the bed 4 and a columnar support portion 34*b* extending upwards from an end portion of the base portion 34*a*. The support portion 34*b* has a side surface, and this side surface is formed in a planar shape along the Z-axis direction.

On the side surface of the support portion 34*b*, a pair of Z-axis guide rails 36 is disposed along the Z-axis direction. On the paired Z-axis guide rails 36, a planar Z-axis moving plate 38 is mounted slidably along the Z-axis guide rails 36. On a side of a back surface of the Z-axis moving plate 38, the back surface opposing the side surface of the support portion 34*b*, a nut portion (not illustrated) is disposed. Threadedly engaged with this nut portion is a Z-axis ball screw (not illustrated) arranged along the Z-axis direction between the paired Z-axis guide rails 36. To an end portion of the Z-axis ball screw, a Z-axis pulse motor 40 is connected to rotate the Z-axis ball screw. On a side of a front surface of the Z-axis moving plate 38, a support member 42 is fixed. When the Z-axis ball screw is rotated by the Z-axis pulse motor 40, the Z-axis moving plate 38 and the support member 42 are moved in the Z-axis direction along the Z-axis guide rails 36.

On the laser processing apparatus 2, a laser beam irradiation unit 44 is also mounted to irradiate the workpiece 11 (see FIG. 2) with a laser beam 48. The laser beam irradiation unit 44 includes a laser processing head 46 supported by the support member 42. The laser beam 48 is applied from the laser processing head 46. By applying the laser beam 48 to the workpiece 11 held on the holding table 28, laser processing is applied to the workpiece 11.

At a position adjacent the laser processing head 46, an imaging unit 50 is disposed. The imaging unit 50 includes an image sensor such as a charged-coupled device (CCD) sensor or a complementary metal-oxide-semiconductor (CMOS) sensor, and images the workpiece 11, etc. (see FIG. 2) supported on the holding table 28. No limitations are imposed on the imaging unit 50, and usable examples include a visible light camera and an infrared light camera. Based on an image captured by imaging the workpiece 11 with the imaging unit 50, an alignment or the like between the workpiece 11 and the laser beam 48 is performed.

When the Z-axis moving plate 38 is moved along the Z-axis direction, the laser processing head 46 and the imaging unit 50 are moved (lifted up or down) along the Z-axis direction. In this manner, an adjustment of the focus position in the Z-axis direction of the laser beam 48 and focusing of the imaging unit 50 are performed.

The laser processing apparatus 2 also includes a display unit (display device) 52 that displays a variety of information regarding the laser processing apparatus 2. As the display unit 52, a touch panel display is used, for example. If this is the case, an operation screen is first displayed on the display unit 52 to input information to the laser processing apparatus 2, and an operator can then input information to the laser processing apparatus 2 by touch operation on the display unit 52. In other words, the display unit 52 also functions as an input unit (input device) for inputting a variety of information to the laser processing apparatus 2, and is also used as a user interface. The input unit may however be an input device, such as a mouse or a keyboard, arranged additionally and independently from the display unit 52.

The laser processing apparatus 2 further includes a controller (control unit, control section, control device) to control the laser processing apparatus 2. The controller 54 is connected to the individual elements (the moving unit 6, the holding table 28, the clamps 30, the laser beam irradiation unit 44, the imaging unit 50, the display unit 52, and so on) that make up the laser processing apparatus 2. The controller 54 operates the laser processing apparatus 2 by generating and outputting control signals that control operation of the elements of the laser processing apparatus 2.

The controller 54 includes, for example, a computer. Described specifically, the controller 54 includes a computing section that performs a variety of computation needed for the operation of the laser processing apparatus 2 and a storage section that stores a variety of information (data, programs, and the like) for use in the operation of the laser processing apparatus 2. The computing section includes a processor such as a central processing unit (CPU). Meanwhile, the storage section includes memories such as a read only memory (ROM) and a random access memory (RAM).

Figure 3:
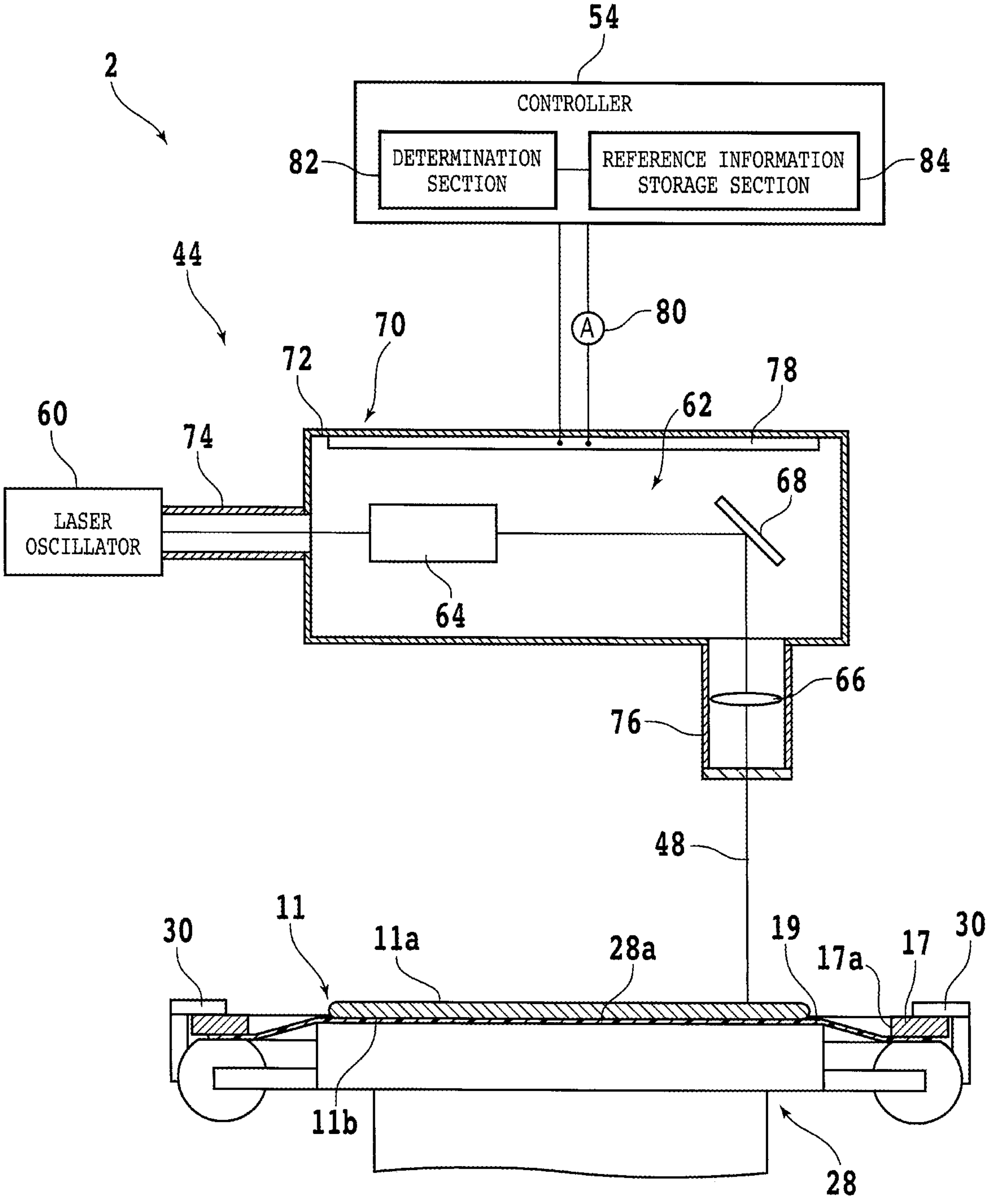
FIG. 3 is a partly cross-sectional side view illustrating the laser processing apparatus.

FIG. 3 is a partly cross-sectional side view illustrating the laser processing apparatus 2. The laser beam irradiation unit 44 includes a laser oscillator 60 such as an yttrium aluminum garnet (YAG) laser, an yttrium orthovanadate ($YVO_4$) laser, or an yttrium lithium fluoride (YLF) laser and an optical system 62 that guides the laser beam 48, which has been outputted from the laser oscillator 60, to the workpiece 11 held on the holding table 28. The optical system 62 includes a plurality of optical components, and controls the traveling direction, profile, focus position, and the like of the laser beam 48 to be applied to the workpiece 11.

Described specifically, the optical system 62 includes an output adjustment unit 64 that adjusts the output of the laser beam 48 emitted from the laser oscillator 60 and a condenser (optical component) 66 that focuses the laser beam 48 emitted from the laser oscillator 60 and adjusted in output by the output adjustment unit 64. For example, an attenuator is used as the output adjustment unit 64, and a focusing lens such as a convex lens is used as the condenser 66. The optical system 62 also includes one or more optical components 68 to guide the laser beam 48 from the laser oscillator 60 to the condenser 66. The one or more optical components 68 correspond to a lens that shapes or focuses the laser beam 48, a mirror that reflects the laser beam 48, and/or the like. A case in which the optical component 68 is a mirror is illustrated as an example in FIG. 3. The laser beam 48 emitted from the laser oscillator 60 enters the condenser 66 by way of the output adjustment unit 64 and the optical component 68. No limitations are however imposed on the kind of the optical component 68. Examples of the optical component 68 include lenses, mirrors, a polarizing beam splitter (PBS), a diffractive optical element (DOE), a liquid crystal on silicon-spatial light modulator (LCOS-SLM), and so on. Further, the optical system 62 may include different two or more kinds of optical components.

The laser beam irradiation unit 44 also includes a casing 70 that accommodates the elements (the output adjustment unit 64, the condenser 66, the optical component 68, and the like) of the optical system 62. The casing 70 includes, for example, a cuboidal case (box) 72 and cylindrical shield tubes 74 and 76. The shield tube 74 is connected on a side of one end thereof to the laser oscillator 60 and on a side of the other end thereof to a side wall of the case 72. Meanwhile, the shield tube 76 is connected on a side of one end thereof to a bottom wall of the case 72, and is covered on a side of the other end thereof by a transparent protective cover through which the laser beam 48 transmits. The shield tube 76 may however be covered on the side of the other end thereof by the condenser 66 instead of the arrangement of the protective cover. The case 72 and the shield tubes 74 and 76 are made from a material that shields the laser beam 48, so that the laser beam 48 is prevented from leaking to an outside of the casing 70. The output adjustment unit 64 and the optical component 68 are accommodated in the case 72, and the condenser 66 is accommodated in the shield tube 76. However, the condenser 66 may also be accommodated in the case 72.

The laser beam 48 emitted from the laser oscillator 60 travels into the case 72 via the shield tube 74, and enters the output adjustment unit 64. The output of the laser beam 48 is therefore adjusted by the output adjustment unit 64. The laser beam 48 emerging from the output adjustment unit 64 is then guided to the shield tube 76 by the one or more optical components 68. After that, the laser beam 48 enters the condenser 66, is focused at a predetermined position, and is applied to the workpiece 11 held on the holding table 28.

When the workpiece 11 is processed by the laser processing apparatus 2, the workpiece 11 is first held on the holding table 28. For example, the workpiece 11 is placed on the holding table 28 such that the workpiece 11 is exposed upwards on the side of the front surface 11*a* and faces the holding surface 28*a* on the side of the back surface 11*b* (on the side of the sheet 19). The frame 17 is then fixed by the clamps 30. When a suction force (negative pressure) of the suction source is allowed to act on the holding surface 28*a* in this state, the workpiece 11 is held by suction on the holding table 28 via the sheet 19.

The laser beam 48 is next applied from the laser beam irradiation unit 44 toward the workpiece 11, so that laser processing is applied to the workpiece 11. Irradiation conditions for the laser beam 48 are set according to details of the laser processing to be applied to the workpiece 11. If ablation processing is applied to the workpiece 11, for example, the wavelength of the laser beam 48 is set such that at least a portion of the laser beam 48 is absorbed in the workpiece 11. In other words, the laser beam 48 to be used has absorptivity for the workpiece 11. Other conditions (average output, repetition frequency, processing feed rate, and so on) for the laser beam 48 are appropriately set such that appropriate ablation processing is applied to the workpiece 11. For example, if the workpiece 11 is a single-crystal silicon wafer and ablation processing is applied to the single-crystal silicon wafer, the irradiation conditions for the laser beam 48 can be set as follows.

Wavelength: 355 nm
Average output: 2 W
Repetition frequency: 200 kHz
Processing feed rate: 400 mm/s When the holding table 28 is moved along the processing feed direction by the moving unit 6 (see FIG. 1) with the laser beam 48 being focused on the front surface 11*a* of the workpiece 11 or inside the workpiece 11, the holding table 28 and the laser beam 48 are moved relative to each other, whereby the laser beam 48 is scanned along the processing feed direction. As a result, ablation processing is applied to the workpiece 11, whereby a linear laser processed groove is formed on the side of the front surface 11*a* of the workpiece 11. The workpiece 11 is divided along the streets 13, for example, by forming laser processed grooves, which extend from the front surface 11*a* to the back surface 11*b* of the workpiece 11, along all the streets 13 (see FIG. 2), respectively. The workpiece 11 can also be divided along the streets 13 by forming laser processed grooves of a depth smaller than the thickness of the workpiece 11 along all the streets 13, respectively, on the side of the front surface 11*a* of the workpiece 11, and then grinding the workpiece 11 on the side of the back surface 11*b* with grinding stones to have the laser processed grooves exposed to the back surface 11*b* of the workpiece 11. As a consequence, a plurality of device chips including the devices 15, respectively, is manufactured.

If contaminants such as particles (dirt, dust, and the like) deposit on the elements (the output adjustment unit 64, the condenser 66, the optical component 68, and the like) of the optical system 62, there may arise a variety of inconveniences such as a distortion in the profile, a deviation in the focus position, and a decrease in the output of the laser beam 48. Therefore, the elements of the optical system 62 are accommodated in the casing 70 in such a manner as to isolate them from the outside. This can prevent particles and the like in the atmosphere from depositing on the elements of the optical system 62. However, components other than the elements of the optical system 62 are also arranged inside the casing 70. For example, a holder that holds the optical component 68 and an actuator, such as a motor, that controls the position or angle of the optical component 68 are also accommodated along with the optical component 68 in the casing 70. Outgas released from the holder and the actuator may therefore deposit on the optical component 68 to contaminate it despite the isolation and sealing of the interior of the casing 70. Moreover, at the time of maintenance of the laser processing apparatus 2, the case 72 is opened to conduct adjustments, replacements, cleaning, and/or the like of the elements of the optical system 62. At that time, particles may penetrate into the casing 70 and may stay there, and may deposit on the elements of the optical system 62 that has been subjected to the maintenance.

In the laser beam irradiation unit 44 in the present embodiment, an ionizer 78 is therefore disposed inside the casing 70 to capture contaminants such as particles that are present there. This can suppress the contaminants which are present inside the casing 70 from floating and depositing on the elements of the optical system 62, thereby making it possible to irradiate the workpiece 11 with the laser beam 48 under appropriate conditions.

The ionizer 78 includes, for example, one or more discharge electrodes (discharge needles), a ground terminal, and a high voltage power source. When a high voltage is applied to each discharge electrode, a corona discharge occurs between the discharge electrode and the ground terminal. As a result, air around the discharge electrode is ionized, so that positive ions and negative ions are produced. For example, a bar-type ionizer 78 with a positive discharge electrode and a negative discharge electrode included therein is fixed on an upper wall of the case 72. Positive ions and negative ions produced by the ionizer 78 are dispersed inside the case 72. The positive ions and negative ions produced by the ionizer 78 act on contaminants such as particles that are present inside the case 72, so that the contaminants are charged positive or negative. The contaminants charged positive or negative then deposit on the negative discharge electrode or the positive discharge electrode of the ionizer 78 to which a negative or positive high voltage is applied. As a consequence, the contaminants inside the case 72 are captured and collected by the ionizer 78, thereby preventing the contaminants from depositing on the output adjustment unit 64, the condenser 66, the optical component 68, and the like.

No particular limitations are imposed on the kind, number, disposition location(s), and the like of the ionizer(s) 78. For example, instead of an ionizer of the type that has a positive electrode and a negative electrode as exemplified above, it is also possible to use, as the ionizer 78, an ionizer of a type that has a single discharge electrode to which a high voltage is applied with its polarity (plus/minus) switched alternately, or two ionizers, one being for the production of positive ions and the other for the production of negative ions, in combination. In addition, a plurality of spot-type (nozzle-type) ionizers 78 may be arranged inside the case 72. In this case, contaminants can be captured at a plurality of locations inside the case 72. If the optical system 62 includes a plurality of optical components 68, ionizers 78 may each be disposed for every optical component 68. If this is the case, the ionizers 78 are each arranged in a predetermined range from the corresponding optical component 68. This prevents the deposition of contaminants on the optical components 68 by the corresponding individual ionizers 78.

In addition to the inside of the case 72, ionizers 78 can also be arranged inside the shield tubes 74 and 76, respectively. In particular, the disposition of the ionizer 78 inside the shield tube 76 effectively prevents the deposition of contaminants on the condenser 66. If an air stream is produced inside the casing 70 upon operation of the ionizer 78, however, contaminants are carried away in the air stream, and become less likely to deposit on the ionizer 78. Therefore, the ionizer 78 is preferably of a windless type that performs no air blowing.

Figure 4:
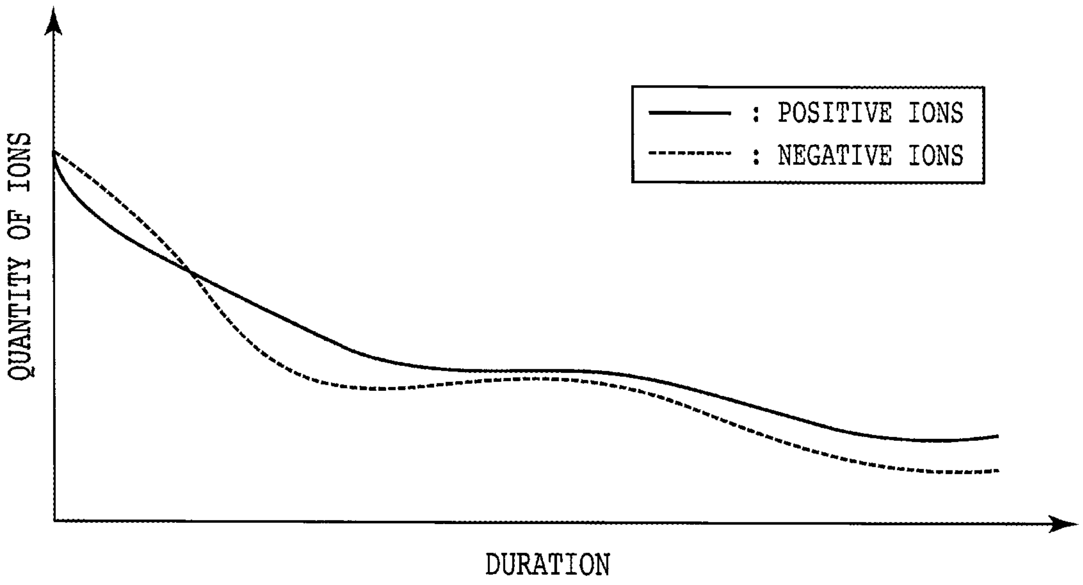
FIG. 4 is a graph illustrating a relation between the duration of ion production and the quantity of ions produced.

FIG. 4 is a graph illustrating a relation between the duration of ion production (the operation time of the ionizer 78) and the quantity of ions produced. When the production of ions by the ionizer 78 is continued, contaminants gradually deposit on the discharge electrode of the ionizer 78, and the exposed area of the discharge electrode decreases. As a result, the quantity of ions to be produced by the ionizer 78 decreases. In other words, as the cleanliness inside the casing 70 increases through the capture of contaminants by the ionizer 78, the production quantity of ions by the ionizer 78 decreases. There is hence a correlation between the quantity of ions produced by the ionizer 78 and the cleanliness of the casing 70.

The cleanliness inside the casing 70 may therefore be determined based on the quantity of ions produced by the ionizer 78. This makes it possible to conduct maintenance and component replacements of the optical system 62 and the ionizer 78 at appropriate timings by monitoring the cleanliness of the casing 70.

Described specifically, the laser beam irradiation unit 44 includes a detector that acquires information (ion amount information) corresponding to the quantity of ions produced by the ionizer 78. For example, an ammeter 80 is connected to the ionizer 78 to measure a current that flows to the inside of the ionizer 78. The ammeter 80 may however be incorporated in the ionizer 78. The ionizer 78 and the ammeter 80 are connected to the controller 54. The controller 54 outputs control signals to the ionizer 78 to operate the ionizer 78 for the production of ions. During the operation of the ionizer 78, the current that flows to the ionizer 78 is measured and monitored by the ammeter 80. When the ionizer 78 is operated for a certain time, charged contaminants deposit on the discharge electrode of the ionizer 78, so that the production quantity of ions decreases (see FIG. 4) and the current that flows to the ionizer 78 changes. A current value that is measured by the ammeter 80 therefore has a value corresponding to the quantity of ions produced by the ionizer 78. The current value measured by the ammeter 80 is then inputted as ion amount information to the controller 54.

The controller 54 includes a determination section 82 and a reference information storage section 84. The determination section 82 determines the cleanliness inside the casing 70 on the basis of the quantity of ions produced by the ionizer 78. The reference information storage section 84 stores information to be used in the determination of cleanliness by the determination section 82. Based on the ion amount information (current value) inputted from the ammeter 80 and the reference information stored in the reference information storage section 84, the determination section 82 determines the cleanliness of the casing 70. For example, a reference value (threshold) for ion amount information measured by the ammeter 80 is stored in the reference information storage section 84. The determination section 82 therefore determines the cleanliness of the casing 70 by comparing the ion amount information inputted from the ammeter 80 with the reference value stored in the reference information storage section 84. Described specifically, if the current value measured by the ammeter 80 is equal to or greater than the reference value (or exceeds the reference value), the determination section 82 determines that the cleanliness of the casing 70 is normal. If the current value measured by the ammeter 80 is smaller than the reference value (or equal to or smaller than the reference value), on the other hand, the determination section 82 determines that the cleanliness of the casing 70 is abnormal.

However, no limitations are imposed on the determination method of the cleanliness of the casing 70. For example, a plurality of reference values may be stored in the reference information storage section 84. In this case, the determination section 82 can determine the cleanliness of the casing 70 in three levels or more by comparing the ion amount information inputted from the ammeter 80 with the reference values. In the reference information storage section 84, correspondence information (a graph, a table, or the like) that represents a correspondence between the ion amount information measured by the ammeter 80 and cleanliness of the casing 70 may also be stored. If this is the case, the determination section 82 can specify the cleanliness corresponding to the ion amount information by mapping the ion amount information inputted from the ammeter 80, to the correspondence information.

When the cleanliness of the casing 70 is determined by the determination section 82, the controller 54 outputs control signals to the display unit 52 (see FIG. 1) to cause the results of the determination by the determination section 82 to be displayed on the display unit 52. The display unit 52 displays, for example, characters, an image, a sign, a numeral, or the like that corresponds to the results of the determination by the determination section 82. In this manner, the operator is notified of the cleanliness of the casing 70.

If a plurality of ionizers 78 are disposed in the casing 70, ammeters 80 are connected to the ionizers 78, respectively, so that the determination of cleanliness is made for every ionizer 78. The display unit 52 then displays the cleanliness determined with respect to each ionizer 78 along with information indicative of the location where the ionizer 78 is arranged. This allows the operator to grasp cleanliness variations inside the casing 70.

The controller 54 may also make the display unit 52 display the time transition of the cleanliness of the casing 70 as determined by the determination section 82. The display unit 52 displays, for example, a graph that represents a relation between the operation time (duration of ion production) of the ionizer 78 and the cleanliness of the casing 70 as determined by the determination section 82. This allows the operator to grasp the time transition of the cleanliness of the casing 70.

As described above, the laser processing apparatus 2 according to the present embodiment includes the casing 70 with the optical system 62 of the laser beam irradiation unit 44 accommodated therein, and the ionizer 78 is arranged inside the casing 70 to capture contaminants. The contaminants in the casing 70 hence are less likely deposit on the elements of the optical system 62, thereby making it possible to irradiate the workpiece 11 with the laser beam 48 under appropriate conditions. The laser processing apparatus 2 according to the present embodiment also includes the determination section 82 that determines the cleanliness inside the casing 70 on the basis of the quantity of ions produced by the ionizer 78. This makes it possible to monitor the cleanliness inside the casing 70 and conduct the maintenance and component replacements of the optical system 62 and the ionizer 78 at appropriate timings.

The description has been made with regard to the case in which the ion amount information is the current value measured by the ammeter 80, but no limitations are imposed on the kind of the detector that acquires the ion amount information. The laser beam irradiation unit 44 may hence include, for example, an ion counter to measure the quantity of ions produced by the ionizer 78.

The ion counter is accommodated in the casing 70 in such a manner as to be arranged in a vicinity of the ionizer 78. However, the ion counter may also be built in the ionizer 78. If a plurality of ionizers 78 are accommodated in the casing 70, ion counters may be arranged in vicinities of the respective ionizers 78. During operation of the ionizer 78, the quantity of ions produced by the ionizer 78 is measured by the ion counter. The quantity of the ions as measured by the ion counter is then inputted as ion amount information to the controller 54. After that, the determination section 82 determines the cleanliness of the casing 70 on the basis of the quantity of the ions as measured by the ion counter and the reference information (reference value or the like) stored in the reference information storage section 84.

The laser processing apparatus 2 illustrated in FIG. 1 may also include a notification unit (notification device) to notify the operator of abnormality. For example, a pilot light (alarm light) may be arranged as the notification unit on an upper part of the laser processing apparatus 2. If the cleanliness of the casing 70 as determined by the determination section 82 is abnormal, the controller 54 notifies the operator of the abnormality of the cleanliness by causing the pilot light to turn on or blink. The notification unit may also be a speaker that gives notification of abnormality by sound or speech.

Moreover, the configurations, the method, and the like according to the above-described embodiment can be practiced with changes or modifications made as appropriate to such extent as not departing from the scope of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus for processing a workpiece, comprising:

a holding table that holds the workpiece; and a laser beam irradiation unit that applies a laser beam to the workpiece held on the holding table, wherein the laser beam irradiation unit has:

a laser oscillator that emits the laser beam, a condenser that focuses the laser beam emitted from the laser oscillator, at least one optical component that guides the laser beam from the laser oscillator to the condenser, a casing that accommodates the at least one optical component, and an ionizer that is disposed inside the casing and captures contaminants that are present inside the casing, wherein the ionizer is of a windless type which does not rely on air flow inside the casing.

2. The laser processing apparatus according to claim 1, further comprising:

a determination section that determines cleanliness inside the casing on a basis of a quantity of ions produced by the ionizer.

3. The laser processing apparatus according to claim 1, wherein the ionizer is fixed to an inner wall of the casing.

4. The laser processing apparatus according to claim 1, wherein a plurality of the ionizers are disposed inside the casing.

5. The laser processing apparatus according to claim 1, wherein the ionizer is disposed inside a shield tube forming part of the casing.

6. The laser processing apparatus according to claim 1, wherein the ionizer includes at least one discharge electrode and a ground terminal.

7. The laser processing apparatus according to claim 1, wherein the ionizer produces ions by corona discharge.

8. The laser processing apparatus according to claim 1, wherein the ionizer is a bar-type ionizer extending along an inner wall of the casing.

9. The laser processing apparatus according to claim 1, wherein the ionizer alternately switches polarity to produce positive ions and negative ions.

10. The laser processing apparatus according to claim 1, wherein a first ionizer produces positive ions and a second ionizer produces negative ions.

11. The laser processing apparatus according to claim 1, wherein the casing is configured to be opened for adjustment or replacement of the at least one optical component.

12. The laser processing apparatus according to claim 2, wherein the quantity of ions is detected based on a current flowing to the ionizer.

13. The laser processing apparatus according to claim 2, further comprising an ammeter electrically coupled to the ionizer to measure a current flowing to the ionizer.

14. The laser processing apparatus according to claim 13, wherein the determination section compares the current measured by the ammeter with a stored reference value.

15. The laser processing apparatus according to claim 13, wherein the ammeter outputs ion amount information corresponding to the quantity of ions produced by the ionizer.

16. The laser processing apparatus according to claim 13, wherein the ammeter is electrically coupled to a controller, and the determination section determines cleanliness based on the current measured by the ammeter.

17. The laser processing apparatus according to claim 14, wherein the determination section determines that cleanliness inside the casing is abnormal when the current measured by the ammeter is less than the stored reference value.

18. The laser processing apparatus according to claim 2, wherein the determination section determines cleanliness inside the casing in two or more levels.

* * * * *